United States Patent
Pisau (10) Patent No.: US 9,257,919 B2
(45) Date of Patent: Feb. 9, 2016

(54) METHOD AND APPARATUS FOR BRUSHLESS DC MOTOR CONTROL

(71) Applicant: Omron Automotive Electronics, Inc, St. Charles, IL (US)

(72) Inventor: Lucretiu Pisau, Highland Park, IL (US)

(73) Assignee: Omron Automotive Electronics, Inc., St. Charles, IL (US)

( * ) Notice: Subject to any disclaimer, the term of this patent is extended or adjusted under 35 U.S.C. 154(b) by 11 days.

(21) Appl. No.: 14/056,153

(22) Filed: Oct. 17, 2013

(65) Prior Publication Data

US 2015/0108931 A1    Apr. 23, 2015

(51) Int. Cl.
  *H02P 6/14*   (2006.01)
  *H02P 6/00*   (2006.01)
  *H02P 6/08*   (2006.01)
  *H02P 6/18*   (2006.01)
  *H02P 31/00*  (2006.01)

(52) U.S. Cl.
  CPC .............. *H02P 6/001* (2013.01); *H02P 6/085* (2013.01); *H02P 6/182* (2013.01); *H02P 31/00* (2013.01)

(58) Field of Classification Search
  CPC ...... H02P 6/182; H02P 6/085; Y02T 10/7005
  See application file for complete search history.

(56) References Cited

U.S. PATENT DOCUMENTS

| 5,517,095 A * | 5/1996 | Carobolante et al. .... 318/400.35 |
| 2010/0052590 A1 * | 3/2010 | Brattoli et al. ................ 318/490 |

* cited by examiner

*Primary Examiner* — Eduardo Colon Santana
*Assistant Examiner* — Cortez Cook
(74) *Attorney, Agent, or Firm* — Murphy, Bilak & Homiller, PLLC (57) ABSTRACT

In one aspect of the teachings herein, an interface circuit obviates the need for a microcontroller with multi-channel PWM capability in the context of controlling a brushless, three-phase DC motor. Instead, the interface circuit generates the requisite set of motor-phase control signals using a single PWM channel from the microcontroller. The interface circuit is implemented as a standalone integrated circuit (IC) in one embodiment, and is integrated into a pre-driver circuit in another embodiment.

7 Claims, 7 Drawing Sheets

PRIOR ART
FIG. 1

| PWM OUTPUTS | EXAMPLE COMMUTATION OF MOTOR-PHASE CONTROL STATES | | | | | | | |
| --- | --- | --- | --- | --- | --- | --- | --- | --- |
| | PHASES A-B | PHASES A-C | PHASES B-C | PHASES B-A | PHASES C-A | PHASES C-B | ALIGN | STOP |
| | 1 | 2 | 3 | 4 | 5 | 6 | | |
| AH | PWM | PWM | LOW | LOW | LOW | LOW | PWM | LOW |
| BH | LOW | LOW | PWM | PWM | LOW | LOW | LOW | LOW |
| CH | LOW | LOW | LOW | LOW | PWM | PWM | LOW | LOW |
| AL* | PWM | PWM | LOW | HIGH | LOW | LOW | PWM | HIGH |
| BL* | HIGH | LOW | PWM | LOW | LOW | HIGH | HIGH | HIGH |
| CL* | LOW | HIGH | HIGH | LOW | PWM | PWM | HIGH | HIGH |

*INVERTED BY DRIVER CIRCUIT

UPDATE

| MOTOR-PHASE CONTROL SIGNALS | SELECTION SIGNAL VALUES (X, Y, Z) | | | | | | | |
|---|---|---|---|---|---|---|---|---|
| | 001 | 010 | 011 | 100 | 101 | 110 | 111 (ALIGN) | 000 (STOP) |
| AH | PWM_OUT | PWM_OUT | LOW | LOW | LOW | LOW | PWM_OUT | LOW |
| BH | LOW | LOW | PWM_OUT | PWM_OUT | LOW | LOW | LOW | LOW |
| CH | LOW | LOW | LOW | LOW | PWM_OUT | PWM_OUT | LOW | LOW |
| AL* | PWM_OUT | PWM_OUT | PWM_OUT | HIGH | HIGH | LOW | PWM_OUT | HIGH |
| BL* | HIGH | LOW | HIGH | LOW | LOW | HIGH | HIGH | HIGH |
| CL* | LOW | HIGH | HIGH | LOW | PWM_OUT | PWM_OUT | HIGH | HIGH |

*INVERTED BY DRIVER CIRCUIT

*FIG. 5*

METHOD AND APPARATUS FOR BRUSHLESS DC MOTOR CONTROL

TECHNICAL FIELD

The present invention generally relates to motor control, and particularly relates to the control of brushless DC motors.

BACKGROUND

Figure 1:
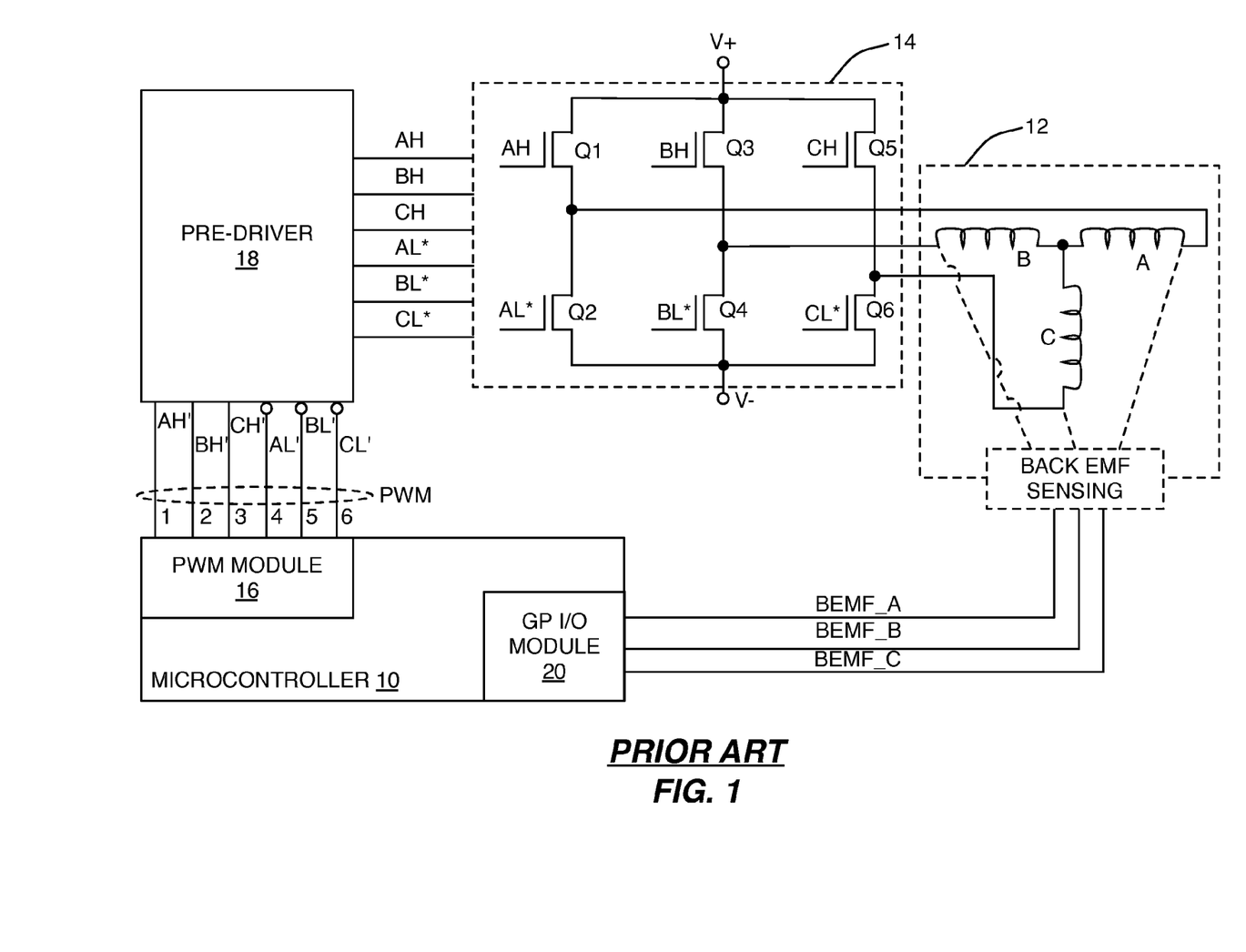
FIG. 1 is a block diagram of a known motor drive arrangement, for driving a brushless, three-phase DC motor.

FIG. 1 illustrates a microcontroller 10 that is configured for controlling a three-phase, brushless DC (BLDC) motor 12. A BLDC motor has a rotor with permanent magnets and a stator with windings, and is electronically commuted by energizing the stator windings in a pattern that rotates around the stator. The pattern—referred to as a rotating voltage vector—energizes two phases a time and induces opposing magnetic poles with respect to the rotor magnets, thereby inducing rotation. In the illustrated example, a drive circuit 14 provides the actual driving signals to the A, B, and C phases of the BLDC 12 and comprises three half-bridge transistor circuits that include a total of six transistors: Q1, Q2, Q3, Q4, Q5 and Q6.

The microcontroller 10 is specially adapted for driving the BLDC 12, based on its inclusion of a PWM module 16 having six PWM channels, PWM1-PWM6. The six channels correspond directly to the six transistors Q1-Q6 in the drive circuit 14, where Q1 is the high-side drive for the Phase A motor winding, Q2 is the low-side drive for the Phase A motor winding, Q3 is the high-side drive for the Phase B motor winding, Q4 is the low-side drive for the Phase B motor winding, Q5 is the high-side drive for the Phase C motor winding, and Q6 is the low-side drive for the Phase C motor winding.

The PWM1 signal is denoted as the AH' signal to denote a logic-level signal as output from the microcontroller 10, and the corresponding gate-drive signal output from the pre-driver circuit 18 is denoted as AH. Similarly, the PWM2 and PWM3 signals are denoted as BH' and CH', respectively, and the pre-driver circuit 18 outputs the corresponding BH and CH gate-drive signals. In this regard, the pre-driver circuit 18 will be understood as converting the logic level signals output from the PWM module 16 of the microcontroller 10 into more robust—higher current—gate drive signals suitable for switching the transistors Q1-Q2 on and off.

The pre-driver circuit 18 also provides negative-logic inputs for the three PWM signals corresponding to the low-side transistors, for complementary PWM-based chopping of the transistors Q1-Q6. That is, the PWM4 signal is denoted as AL' to indicate that it corresponds to the low-side drive transistor Q2, and the pre-driver circuit 18 outputs AL* as the complementary drive-level version of that signal. Likewise, PWM5 is denoted as BL' and the pre-driver circuit 18 provides the corresponding complementary signal BL* for driving the low-side transistor Q4, and PWM6 is denoted as CL' and the pre-driver circuit 18 provides the corresponding complementary signal CL* for driving the low-side transistor Q6.

With this arrangement, the microcontroller 10 energizes the A-B phases of the BLDC motor 12, for example, by outputting the same PWM signal on PWM1 (AH) and PWM4 (AL), and outputting a LOW signal on PWM5 (BL). With these signals and inversion by the pre-driver circuit 18, Q1 is chopped by the PWM signal output on PWM1, Q2 is chopped by the complementary version of that PWM signal, and the gate of Q4 is driven high (i.e., Q4 is turned on). As is known, the complementary chopping of Q1 and Q2 provide for motor speed control with current recirculation via the drive transistor body diodes.

Figure 2:
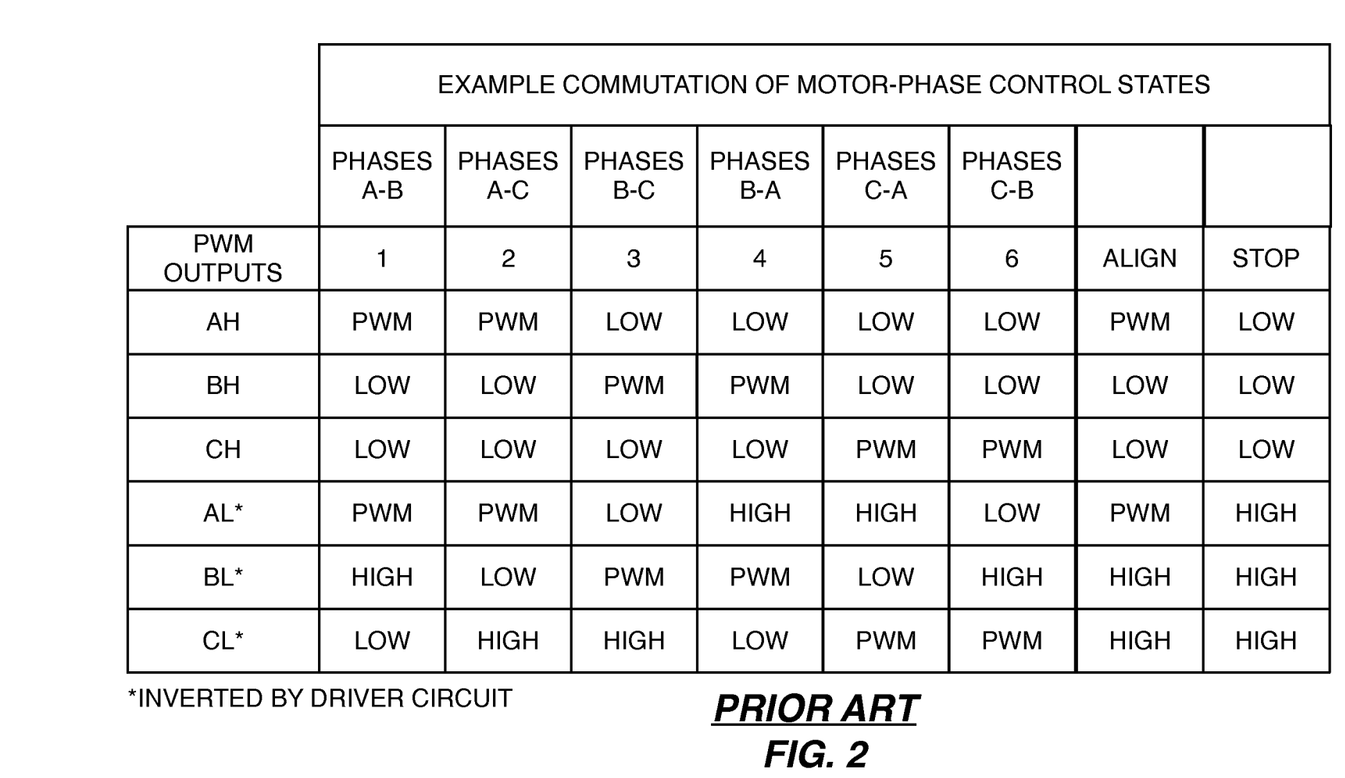
FIG. 2 is an example commutation table corresponding to the motor drive arrangement of FIG. 1.

Broadly, the microcontroller 10 controls the set of six PWM signals as motor phase control signals used to apply the aforementioned mentioned rotating voltage vector to the BLDC motor 12. According to such operation, the PWM signals sequentially energize phase pairs in the BLDC motor 12 according to the desired rotational direction and speed. FIG. 2 illustrates the correspondence between the PWM signal states and the corresponding motor-phase control states. Synchronous control of the BLDC motor 12 depends on knowing rotor position and, in the illustrated example, back-EMF (electromotive force) sensing is used to detect rotor position. Back-EMF sensing can be understood as a "sensorless" technique. Other position-sensing techniques rely on encoders or Hall effect sensors. In FIG. 1, the microcontroller 10 uses a general purpose input/output (GPIO) module 20 to obtain rotor position information.

While the foregoing control arrangement is well understood, it is not without certain disadvantages. For example, while the cost of microcontrollers has declined dramatically over the last several decades, they often still represent a significant fraction of the overall expense in a given motor-control circuit. In part this expense arises from the tendency for multi-channel PWM modules to be included only in more full-featured microcontroller families, thus obligating the designer oftentimes to design around a microcontroller that includes more sophistication and more features than are needed in the contemplated motor-control circuit.

SUMMARY

In one aspect of the teachings herein, an interface circuit obviates the need for a microcontroller with multi-channel PWM capability in the context of controlling a brushless, three-phase DC motor. Instead, the interface circuit generates the requisite set of motor-phase control signals using a single PWM channel from the microcontroller. The interface circuit is implemented as a standalone integrated circuit (IC) in one embodiment, and is integrated into a pre-driver circuit in another embodiment.

In an example embodiment, the interface circuit is configured to interface a microcontroller with a motor drive circuit comprising three half-bridge transistor circuits, for driving a brushless, three-phase DC motor. Here, the interface circuit includes a first input terminal configured to receive a single PWM input signal from the microcontroller and further includes second input terminals configured to receive a binary selection signal from the microcontroller. The selection signal has a number of defined selection values, and each selection value corresponds to a motor-phase control state in a defined set of motor-phase control states.

The interface circuit further includes a set of output terminals, and a control circuit configured to select a motor-phase control state corresponding to the selection value of the selection signal. The control circuit selects the motor-phase control state based on being configured to obtain a PWM output signal from the PWM input signal and map the PWM output signal to a selected pair of the output terminals in dependence on the selection value, while setting the remaining output terminals to a combination of on and off states in dependence on the selection value, thereby providing a set of motor-phase control signals from the output terminals corresponding to the selected motor-phase control state.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 3:
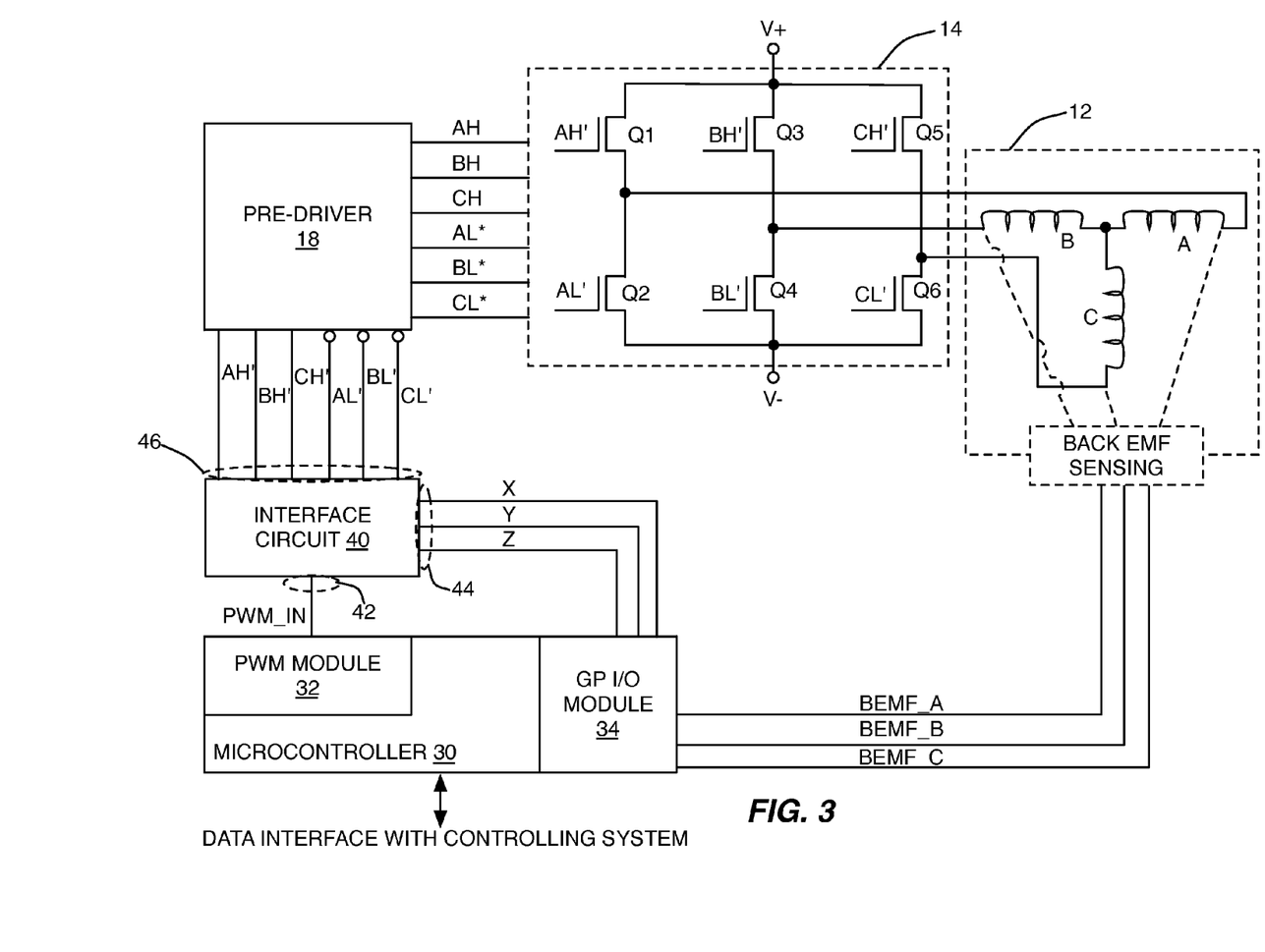
FIG. 3 is a block diagram of one embodiment of an interface circuit, as contemplated herein for simplifying the control of brushless three-phase DC motors.

FIG. 3 illustrates an example arrangement contemplated in the context of this disclosure, representing an advantageous alternative to the arrangement depicted in FIG. 1. One sees the previously described BLDC motor 12 and associated drive circuit 14, along with the pre-driver circuit 18. However, an interface circuit 40 as contemplated herein advantageously allows for a simplified microcontroller 30, as compared to the microcontroller 10 used for motor control in FIG. 1. Here, the microcontroller 30 includes a simple single-channel PWM module 32—which can be a timer output or repurposed general purpose input/output—for providing a single PWM signal. The microcontroller 30 further includes a GPIO module 34 that is used for detecting rotor position via back-EMF sensing of the BLDC motor 12 and for providing what is termed herein as a "binary selection signal" and is denoted in the diagram as a set of digital signals X, Y and Z. It will be appreciated that the binary set {X, Y, Z} provides for $2^3=8$ unique selection values.

In turn, the interface circuit 40 is configured to interface the microcontroller 30 with the motor drive circuit 14, which in the diagram comprises three half-bridge transistor circuits that are configured for driving the three phases of the BLDC motor 12. The interface circuit 40 includes a first input terminal 42 configured to receive a single PWM input signal from the microcontroller 30, second input terminals 44 configured to receive the binary selection signal from the microcontroller 30, and output terminals 46 configured to output motor-phase control signals AH', BH', CH', AL', BL' and CL'. The values taken on by the motor-phase control signals are determined by the state of the binary selection signal, which has a number of defined selection values. Each selection value corresponding to a motor-phase control state in a defined set of motor-phase control states. It will be appreciated that each selection value is represented as a defined combination or pattern of "1s" and "0s" for the set {X,Y,Z}.

Figures 6, 7:
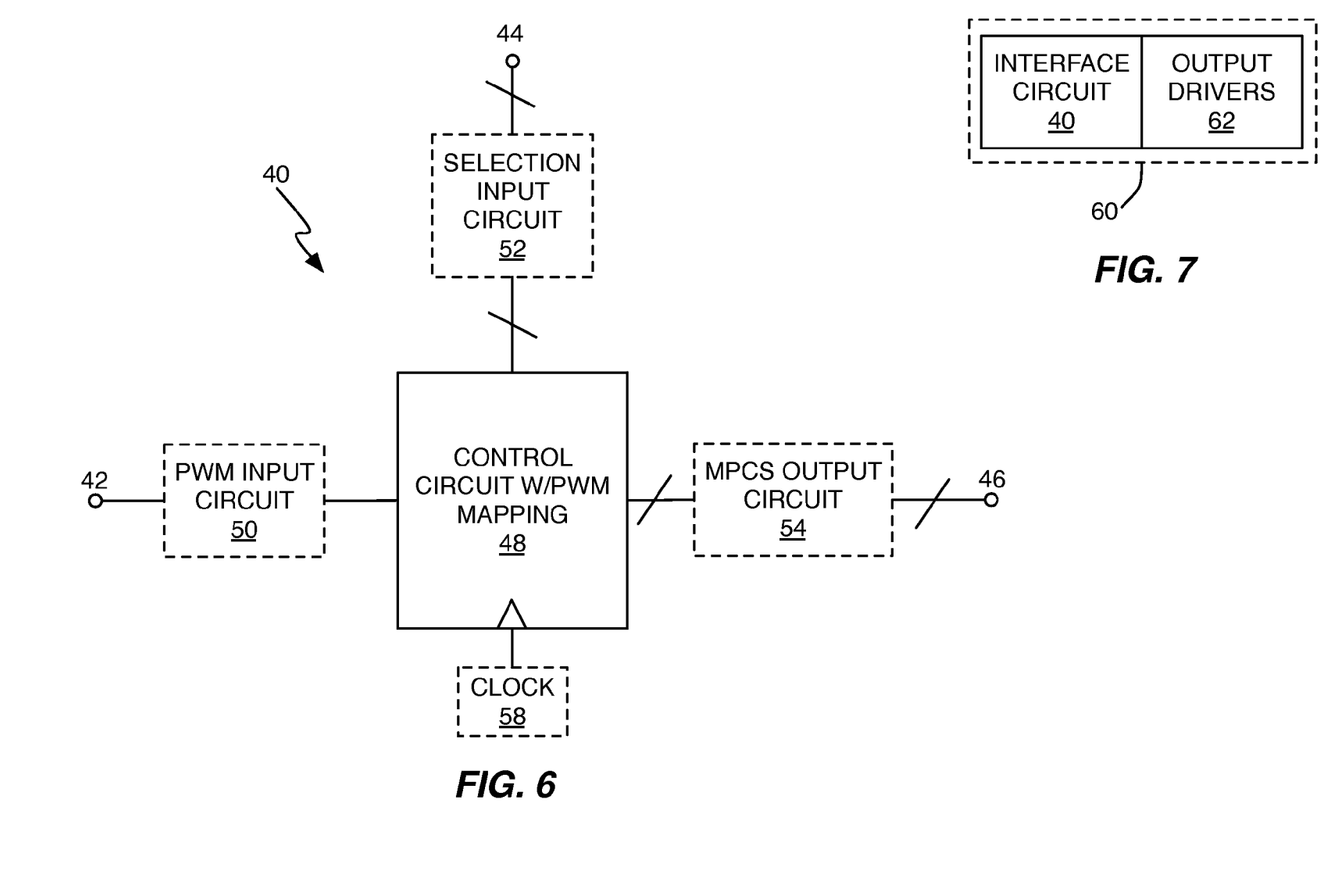
FIG. 6 is a block diagram of one embodiment of the contemplated interface circuit.
FIG. 7 is a block diagram of another embodiment of the contemplated interface circuit.

Jumping ahead momentarily to FIG. 6, one sees that the interface circuit 40 further includes a control circuit 48 that is configured to select a motor-phase control state corresponding to the selection value of the selection signal. Still in the context of FIG. 6, one sees that the first input terminal 42 may couple through a PWM input circuit 50. In its simplest implementation, the PWM input circuit 50 is a conductor, but in other embodiments the PWM input circuit 50 includes ESD protection and/or signal buffering, e.g., voltage buffering for the PWM input signal. Similarly, the binary selection signal is applied to the second input terminals 44 and coupled to the control circuit 48 through a selection input circuit 52, which may comprise a simple conductor and/or include ESD and buffering components. Further, the motor-phase control signals—denoted as "MPCS" in the diagram—are output from the control circuit 48 to the output terminals 46 through an MPCS output circuit, which may comprise conductors, or which may include output buffering and/or level shifting circuitry, in dependence on the particular output signal levels and drive characteristics desired for the interface circuit 40.

The control circuit 48 includes PWM mapping features and is configured to obtain a PWM output signal from the PWM input signal received on the input terminal 42. Here, the PWM output signal is "obtained" by simply passing through the PWM input signal, or by buffering and/or level shifting that signal. In any case, the control circuit 48 is configured to map the PWM output signal to a selected pair of the output terminals in dependence on the selection value, while setting the remaining output terminals to a combination of on and off states in dependence on the selection value, thereby providing a set of motor-phase control signals from the output terminals corresponding to the selected motor-phase control state.

In some embodiments, the interface circuit 40 and its included control circuit 48 comprise a combinatorial logic circuit. In other embodiments, the interface circuit 40 comprises a clocked circuit that is configured to transition the motor-phase control signals through an all-off state that is one or more clock cycles in duration, when changing between motor-phase control states. See, e.g., the example clock circuit 58 in FIG. 6, which provides a clocking signal to the control circuit 48. Introduction of the all-off condition for one or more clock cycles in between the transition of the motor-phase control signals from one motor-phase control state to the next can be understood as a "dead-time" insertion that prevents simultaneous conduction by a high-side/low-side transistor pair in the motor drive circuit 14.

As noted, the output terminals 46 of the interface circuit 40 may comprise logic-level outputs, for input to the pre-driver circuit 18, which is adapted for generating corresponding drive-level output signals for the motor drive circuit 14. In other embodiments, the interface circuit 40 may be configured to provide drive-level signals from its output terminals 46. Likewise, the "on" and "off" states imposed on selected ones of the output terminals 46 for any given motor-phase control state may be any correspondingly defined voltage level, etc., in dependence on whether the interface circuit 40 is separate from or included in the pre-driver circuit 18 and on whether the pre-driver circuit 18 provides logic inversion on any of its inputs, etc.

In particular, in that regard, the interface circuit 40 in one embodiment maps the PWM output signal to the appropriate pair of the output terminals 46 for the selected motor-phase control state, where one of those output terminals corresponds to the high-side transistor in a given phase of the BLDC motor 12 and the other one of those output terminals corresponds to the low-side transistor of the same motor phase. In other words, the mapping provides for high-side and low-side transistor chopping for Phase A when Phases A-B or A-C are energized, and for Phase B when Phases B-C or B-A are energized, and for Phase C when Phases C-A or C-B are energized. This arrangement presupposes that the pre-driver circuit 18 provides inversion for the PWM output signal from one such interface circuit terminal, so that the high-side/low-side transistor pairs are chopped in complementary fashion. It is also contemplated that the interface circuit 40 provides complementing for the PWM output signal in installations where the pre-driver circuit 18 is not used, or in installations where the pre-driver circuit 18 does not provide the complement function.

Figure 4A:
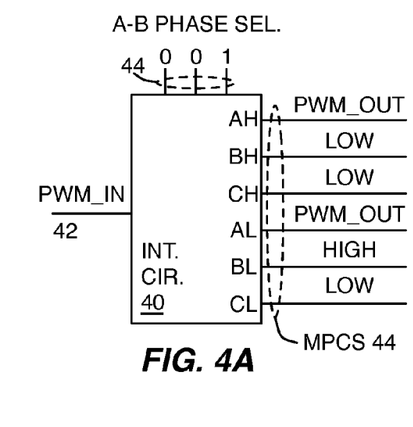
FIGS. 4A-4H are block diagrams illustrating operation of the PWM mapping function implemented in one embodiment of the interface circuit introduced in FIG. 3.
Figure 4B:
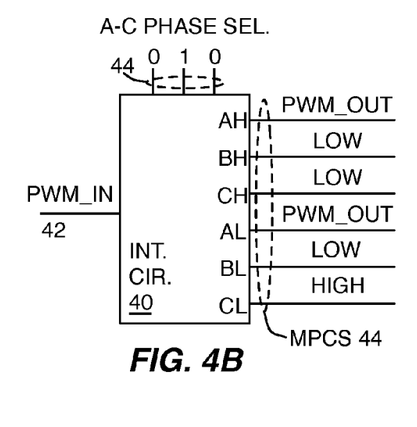
Figure 4C:
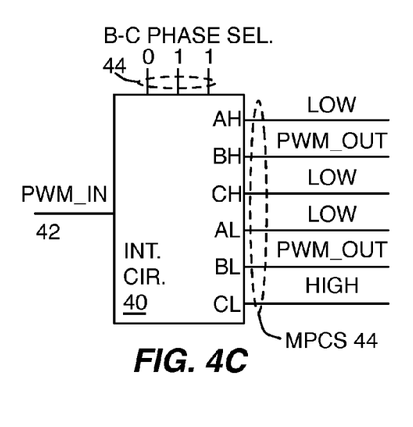
Figure 4D:
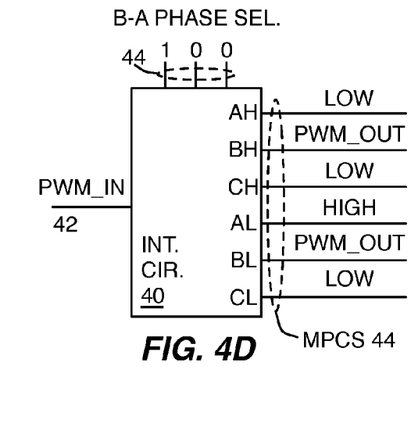
Figure 4E:
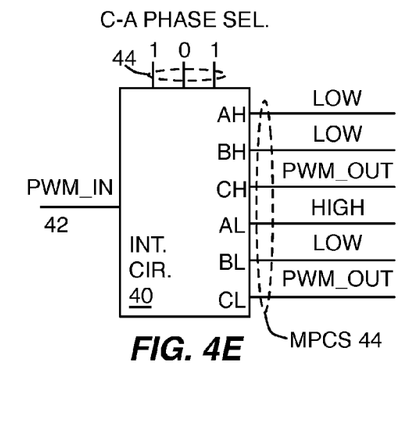
Figure 4F:
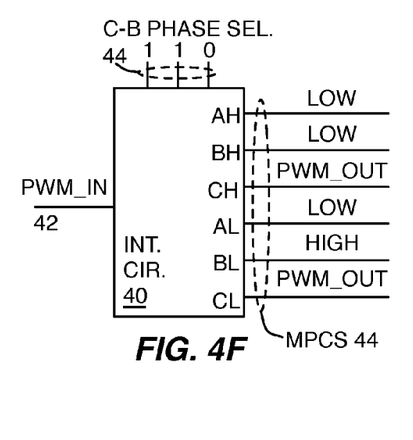
Figure 4G:
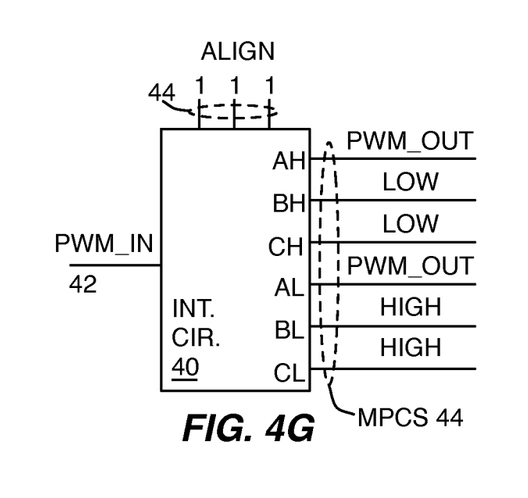
Figure 4H:
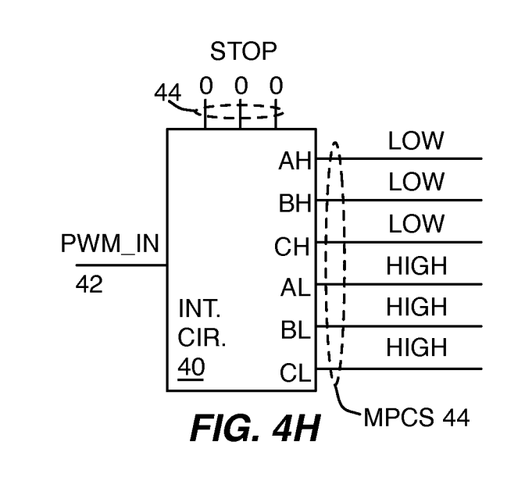

FIGS. 4A-4H illustrate six motor-phase control states (FIGS. 4A-4F) and two additional control states (an "Align" state in FIG. 4G and a "Stop" state in FIG. 4H). FIG. 4A illustrates A-B phase selection via setting {X,Y,Z}={001}. That selection value causes the interface circuit 40 to map the PWM output signal (PWM_OUT) to the pair of output terminals 46 corresponding to AH and AL in the motor drive circuit 14, while setting the remaining output terminals the appropriate combination of on and off states. In particular, the interface circuit 40 sets the BL output terminal 46 to HIGH (or to whatever level corresponds to the on state for the BL transistor Q4 in the motor drive circuit 14) and sets the other to LOW (or to whatever level corresponds to the off state for the BH, CH and CL transistors in the motor drive circuit 14).

FIG. 4B illustrates the mapping for the A-C phase selection, FIG. 4C illustrates the mapping for the B-C phase selection, FIG. 4D illustrates the mapping for the B-A phase selection, FIG. 4E illustrates the mapping for the C-A phase selection and FIG. 4F illustrates the mapping for the C-B phase selection. Finally, as noted, FIG. 4G illustrates the mapping for an alignment state, used for initially aligning the rotor of the BLDC motor 12, and FIG. 4H illustrates a stop state, in which the PWM input signal is not mapped to any of the output terminals 46, even if it remains active from the microcontroller 30.

Figure 5:
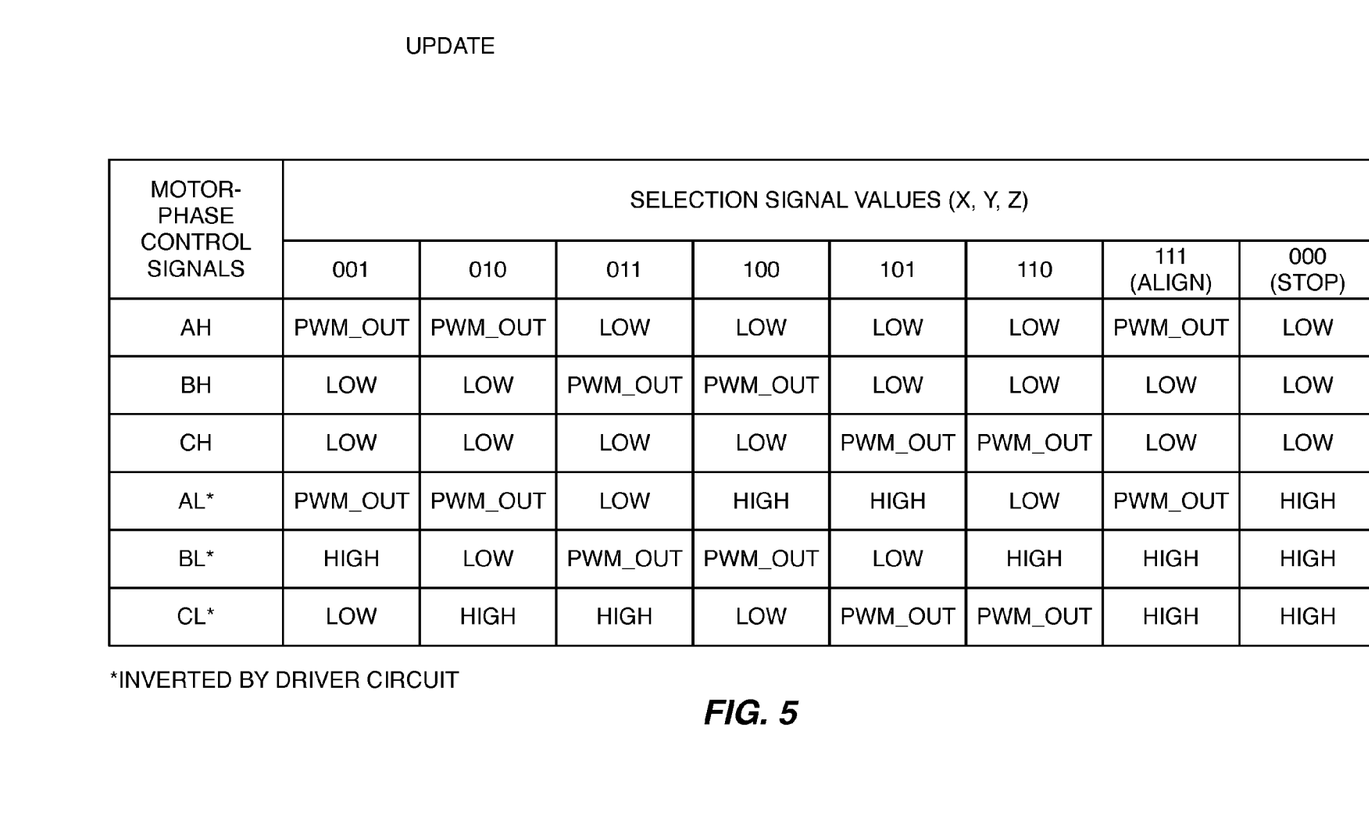
FIG. 5 is a table illustrating example motor-phase control signal generation by the contemplated interface circuit, according to one embodiment.

FIG. 5 tabulates the control logic and mappings represented by FIGS. 4A-4H and demonstrates that the interface circuit 40 provides a complete set of motor-phase control signals for a three-phase BLDC motor based on a single PWM output and associated phase selection signals from the supporting microcontroller 30. As noted, such operation allows for significant cost reductions in the overall circuit implementation because more rudimentary microcontrollers can be used. Further convenience and cost savings can be realized in at least some implementations by integrating the contemplated interface circuit 40 within the pre-driver circuit itself. That arrangement is shown by way of example in FIG. 7, where the interface circuit 40 is included within a pre-driver circuit 60, which includes output drivers 62 that provide drive-level signals for the motor drive circuit 14.

Notably, modifications and other embodiments of the disclosed invention(s) will come to mind to one skilled in the art having the benefit of the teachings presented in the foregoing descriptions and the associated drawings. For example, while the example circuit presented in FIG. 3 is discussed in the context of "chopping" using the high side FETs, with the low side FETs used for syncing and active recirculation, there is no technical reason why the arrangement cannot be reversed. That is, the teachings herein are directly applicable to an arrangement where chopping is done using the low side FETs, with the high side FETs used for active recirculation.

Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. An interface circuit configured to interface a microcontroller with a motor drive circuit comprising three half-bridge transistor circuits, for driving a brushless, three-phase DC motor, said interface circuit comprising:

a first input terminal configured to receive a single PWM input signal from the microcontroller;

second input terminals configured to receive a binary selection signal from the microcontroller, said selection signal having a number of defined selection values, each selection value corresponding to a motor-phase control state in a defined set of motor-phase control states;

a set of output terminals; and a control circuit configured to select a motor-phase control state corresponding to the selection value of the selection signal, based on being configured to:

obtain a PWM output signal from the PWM input signal; and map the PWM output signal to a selected pair of the output terminals in dependence on the selection value, while setting the remaining output terminals to a combination of on and off states in dependence on the selection value, thereby providing a set of motor-phase control signals from the output terminals corresponding to the selected motor-phase control state.

2. The interface circuit of claim 1, wherein the control circuit comprises a combinatorial logic circuit.

3. The interface circuit of claim 1, wherein the control circuit is configured to obtain the PWM output signal via an included mapping circuit that passes the PWM input signal, or a buffered version thereof, to the selected pair of the output terminals, which pair is selected according to the selection value of the selection signal.

4. The interface circuit of claim 1, wherein the output terminals of the interface circuit comprise logic-level outputs, for input to a pre-driver circuit that is adapted for generating corresponding drive-level output signals for the motor drive circuit.

5. The interface circuit of claim 4, wherein the interface circuit is configured to set the remaining output terminals to said combination of on and off states in dependence on the selection value based on setting each remaining terminal to a logic high state or to a logic low state, according to said combination of on and off states.

6. The interface circuit of claim 1, wherein the interface circuit is comprised within a pre-driver circuit that provides drive-level signals to the motor drive circuit corresponding to the motor-phase control signals output by the interface circuit.

7. The interface circuit of claim 1, wherein the interface circuit comprises a clocked circuit that is configured to transition the motor-phase control signals through an all-off state that is one or more clock cycles in duration, when changing between motor-phase control states.

\* \* \* \* \*